United States Patent
Nakano et al.

(10) Patent No.: US 11,978,292 B2
(45) Date of Patent: May 7, 2024

(54) VEHICLE NOISE INSPECTION APPARATUS

(71) Applicant: TOYOTA JIDOSHA KABUSHIKI KAISHA, Toyota (JP)

(72) Inventors: Masato Nakano, Toyota (JP); Daiki Sato, Toyota (JP); Hiroki Onuma, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 316 days.

(21) Appl. No.: 17/501,803

(22) Filed: Oct. 14, 2021

(65) Prior Publication Data
US 2022/0148347 A1 May 12, 2022

(30) Foreign Application Priority Data

Nov. 10, 2020 (JP) ................................ 2020-187217

(51) Int. Cl.
*G07C 5/08* (2006.01)
*G06N 3/08* (2023.01)
*G10L 25/51* (2013.01)

(52) U.S. Cl.
CPC ............. *G07C 5/085* (2013.01); *G06N 3/08* (2013.01); *G10L 25/51* (2013.01)

(58) Field of Classification Search
CPC .......... G07C 5/085; G06N 3/08; G06N 3/084; G10L 25/51; G10L 25/30; G05B 23/0281; G05B 23/0208

(Continued)

(56) References Cited

U.S. PATENT DOCUMENTS 5,410,605 A * 4/1995 Sawada ............ G10K 11/17825
381/71.14
5,419,197 A * 5/1995 Ogi ...................... H02H 1/0092
73/659

(Continued)

FOREIGN PATENT DOCUMENTS

EP 2113755 A1 * 11/2009 ............. G01H 17/00
JP 07248781 A * 9/1995

(Continued)

OTHER PUBLICATIONS

Selcuk Erkaya, Analysis of the vibration characteristics of an experimental mechanical system using neural networks, 2011, Sage, Journal of Vibration and Control 18(13) 2059-2072 (Year: 2011).*

(Continued)

*Primary Examiner* — Jaime Figueroa
(74) *Attorney, Agent, or Firm* — Oliff PLC

(57) ABSTRACT

A storage device of a noise inspection apparatus is configured to store a neural network machine-learned to receive, as inputs, an original sound characteristic value indicating a characteristic of sound generated by a transmission and an evaluation sound characteristic value indicating a characteristic of sound that reaches a vehicle cabin, and output a route part characteristic value that is a value indicating a characteristic of a vibration transfer of a vehicle part positioned on a vibration transfer route from the transmission to the vehicle cabin. An execution device of the noise inspection apparatus is configured to calculate, as an estimated value of the route part characteristic value, an output of the neural network that has received, as inputs, measured values of the original sound characteristic value and the evaluation sound characteristic value.

4 Claims, 5 Drawing Sheets

(58) Field of Classification Search
USPC .......................................................... 701/29.1
See application file for complete search history.

(56) References Cited

U.S. PATENT DOCUMENTS

| | | | | |
|---|---|---|---|---|
| 5,434,783 | A * | 7/1995 | Pal ....................... | G05B 13/027 |
| | | | | 700/280 |
| 5,602,761 | A * | 2/1997 | Spoerre ................. | G01H 1/003 |
| | | | | 702/179 |
| 5,995,910 | A * | 11/1999 | Discenzo .............. | G01H 1/003 |
| | | | | 702/56 |
| 6,493,689 | B2 * | 12/2002 | Kotoulas .............. | G10K 11/178 |
| | | | | 706/23 |
| 6,751,602 | B2 * | 6/2004 | Kotoulas ............... | F16F 15/02 |
| | | | | 700/48 |
| 7,059,820 | B2 * | 6/2006 | Hosny .............. | G10K 11/17857 |
| | | | | 415/13 |
| 8,731,868 | B2 * | 5/2014 | Janssens ................ | G01H 17/00 |
| | | | | 702/56 |
| 10,726,863 | B2 * | 7/2020 | Yu ........................ | G06F 16/51 |
| 11,361,782 | B2 * | 6/2022 | Ninomiya .............. | G10L 25/18 |
| 11,556,792 | B2 * | 1/2023 | Song .................... | G07C 5/0808 |
| 2002/0117579 | A1 * | 8/2002 | Kotoulas .............. | G10K 11/178 |
| | | | | 244/1 N |
| 2004/0011340 | A1 * | 1/2004 | Hosny ..................... | F16F 15/02 |
| | | | | 123/559.1 |
| 2004/0030664 | A1 * | 2/2004 | Kotoulas .............. | G10K 11/178 |
| | | | | 706/22 |
| 2007/0227246 | A1 * | 10/2007 | Vian ..................... | G05B 23/024 |
| | | | | 73/462 |
| 2007/0272013 | A1 * | 11/2007 | Vian ..................... | G05B 23/024 |
| | | | | 73/460 |
| 2008/0144927 | A1 | 6/2008 | Hashimoto et al. | |
| 2009/0276197 | A1 * | 11/2009 | Janssens ................ | G01H 17/00 |
| | | | | 703/2 |
| 2016/0343180 | A1 * | 11/2016 | Talwar ................. | G07C 5/0808 |
| 2018/0358033 | A1 * | 12/2018 | Yu ......................... | G06F 16/686 |
| 2020/0193291 | A1 * | 6/2020 | Lee ...................... | G05B 23/024 |
| 2021/0208026 | A1 * | 7/2021 | dos Santos ............ | G06N 3/044 |
| 2021/0304785 | A1 * | 9/2021 | Ninomiya ................ | G01H 3/08 |

FOREIGN PATENT DOCUMENTS

JP      2008-151538 A      7/2008
WO     WO-2019228625 A1 * 12/2019 ............... G01H 1/00

OTHER PUBLICATIONS

Yildirim et al, Noise and Vibration Analysis of Car Engines using Proposed Neural Network, 2009, Sage, Journal of Vibration and Control, 15(1): 133-156, 2009 DOI: 10.1177/1077546307087394 (Year: 2009).*

Braun et al, Noise source characteristics in the ISO 362 vehicle pass-by noise test, 2013, Elsevier, Applied Acoustics 74 (2013) 1241-1265 (Year: 2013).*

* cited by examiner

VEHICLE NOISE INSPECTION APPARATUS

CROSS-REFERENCE TO RELATED APPLICATION

This application claims priority to Japanese Patent Application No. 2020-187217 filed on Nov. 10, 2020, incorporated herein by reference in its entirety.

BACKGROUND

1. Technical Field

The present disclosure relates to a vehicle noise inspection apparatus.

2. Description of Related Art

Japanese Unexamined Patent Application Publication No. 2008-151538 describes an apparatus that determines the presence or absence of an abnormality of a transmission and the like, using a neural network that is machine-learned by receiving a frequency component of sound inside a vehicle cabin as an input and outputting a determination result of the presence or absence of the abnormality.

SUMMARY

Sound generated by a transmission due to gear rattle and the like may be heard as unpleasant noise in a vehicle cabin. The sound generated by the transmission reaches the vehicle cabin via a number of routes. The sound that reaches the vehicle cabin changes depending on a vibration transfer characteristic of a vehicle part-positioned on a transfer route. For this reason, even when the sound itself generated by the transmission is within a design permissible range, the sound may be heard as unpleasant noise to an occupant depending on the vibration transfer characteristic of the vehicle part positioned on the transfer route of the sound/vibration that reaches the vehicle cabin. As such, a number of vehicle parts are associated with noise.

When a precise noise inspection for specifying a vehicle part that is a cause of noise, predicting the presence or absence of noise generation, or the like, is executed using an existing analytical method, it is necessary to measure the vibration transfer characteristic of each of the vehicle parts associated with the noise. However, as described above, there are a number of vehicle parts associated with the noise, and for some of them, it is not possible to measure the vibration transfer characteristic unless they are removed from the vehicle. For this reason, it is not possible to easily execute a precise noise inspection.

Here, a vehicle part that is a source of noise is set as a sound source part, a vehicle part positioned on a transfer route of vibration from the sound source part to an evaluation position of the noise is set as a route part, a value indicating a vibration transfer characteristic of the route part is set as a route part characteristic value, a value indicating a characteristic of sound generated by the sound source part is set as an original sound characteristic value, a value indicating a characteristic of the sound that reaches the evaluation position of the noise is set as an evaluation sound characteristic value, and one of the route part characteristic value and the evaluation sound characteristic value is set as a first characteristic value and the other is set as a second characteristic value. At this time, a noise inspection apparatus of a vehicle includes a storage device configured to store a neural network that is learned using, as teacher data, measured values of the original sound characteristic value, the first characteristic value, and the second characteristic value, and an execution device configured to execute an estimation process for calculating, as an estimated value of the second characteristic value, an output of the neural network that receives the measured values of the original sound characteristic value and the first characteristic value as inputs. The neural network receives the original sound characteristic value and the first characteristic value as inputs, and outputs the second characteristic value.

In the neural network stored in the storage device of the noise inspection apparatus, a relationship between the original sound characteristic value, the evaluation sound characteristic value, and the route part characteristic value is learned. Therefore, when the same neural network is used, it is possible to calculate an estimated value of the route part characteristic value from the measured values of the original sound characteristic value and the evaluation sound characteristic value, or calculate an estimated value of the evaluation sound characteristic value from the measured values of the original sound characteristic value and the route part characteristic value. As such, it is possible to estimate the vibration transfer characteristic even without removing a route part from the vehicle for measurement, and estimate whether the part would generate noise were the part to be provided on the vehicle even without providing it on the vehicle. Therefore, it is possible to easily execute a precise noise inspection.

The input of the neural network may include a traveling state quantity which is a quantity indicating a traveling state of the vehicle, and the teacher data may include a measured value of the traveling state quantity at the time of measuring the evaluation sound characteristic value. In such a case, it is possible to execute learning of the neural network and estimate the second characteristic value by reflecting a change in the original sound characteristic value or the evaluation sound characteristic value depending on the traveling state of the vehicle.

As the route part characteristic value, for example, a transfer coefficient and a phase of the vibration of the route part may be used. In addition, as the original sound characteristic value and the evaluation sound characteristic value, any one of waveform data of the sound and a frequency spectrum may be used.

When the neural network is configured to set the route part characteristic value as the second characteristic value, the execution device may execute a determination process for determining whether the route part is the cause of the noise based on the calculated value of the route part characteristic value in the estimation process in a state where the generation of the noise is confirmed. In such a case, it is possible to specify the route part that is the cause of the noise based on a determination result of a determination process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
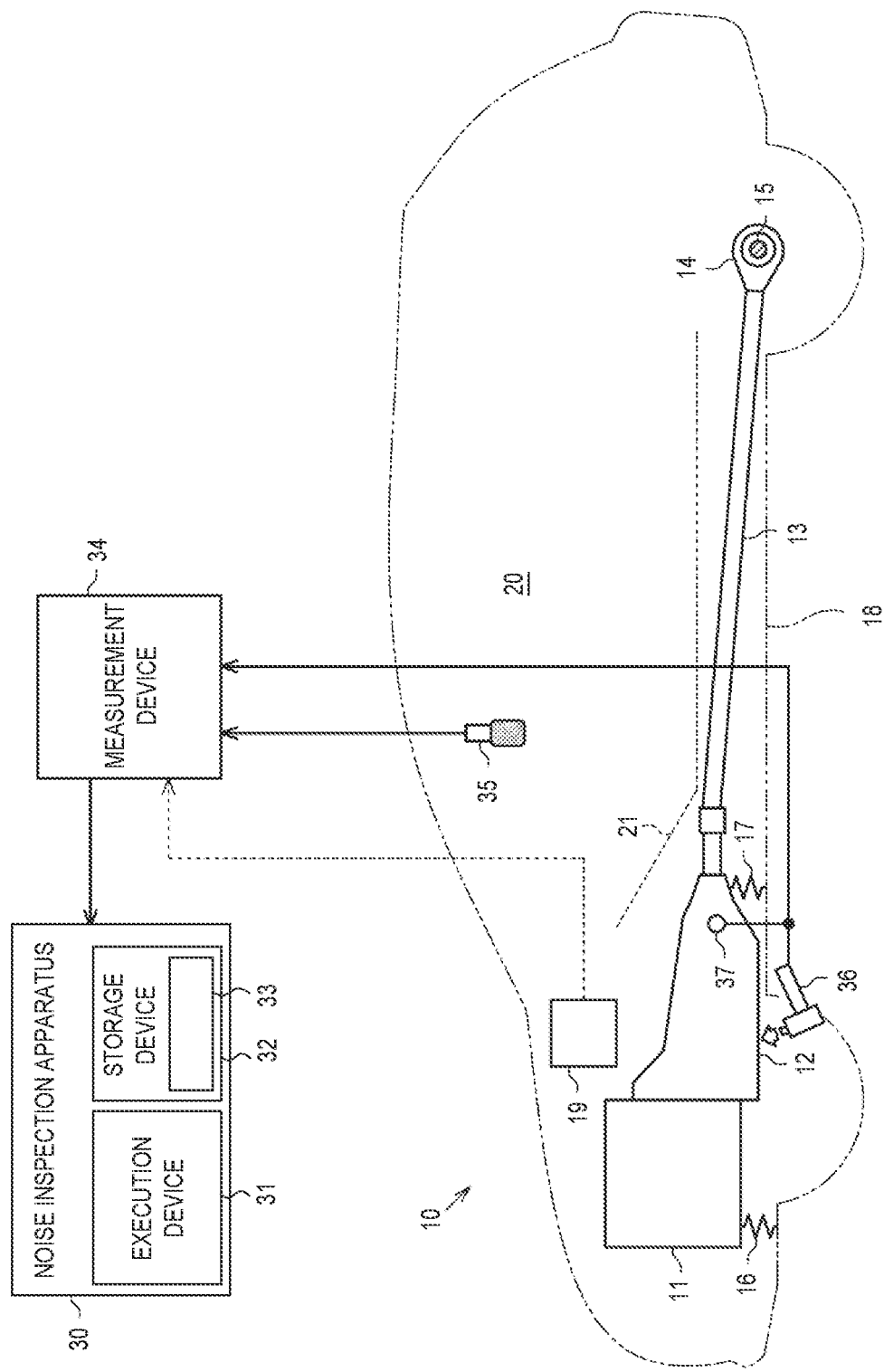
FIG. 1 is a diagram schematically illustrating a configuration of a first embodiment of a vehicle noise inspection apparatus.

Hereinafter, a first embodiment of a vehicle noise inspection apparatus will be described in detail with reference to FIGS. 1 to 3.

Noise of Vehicle to be Inspected

First, a configuration of a drive system of a vehicle 10, which is a target inspected by the noise inspection apparatus according to the present embodiment, will be described with reference to FIG. 1. The vehicle 10 has an engine 11 mounted thereon as a drive source. An output of the engine 11 is connected to a wheel shaft 15 via a transmission 12, a propeller shaft 13, and a differential gear mechanism 14. The engine 11 and the transmission 12 are suspended from a vehicle body 18 via an engine mount 16 and a transmission mount 17. The drive system of the vehicle 10 is composed of the engine 11, the transmission 12, the propeller shaft 13, the differential gear mechanism 14, the wheel shaft 15, and the like. A sound insulating material 21 is interposed between the components of the drive system and a vehicle cabin 20 which an occupant rides in.

Moreover, the vehicle 10 has an electronic control unit 19 mounted thereon. In the electronic control unit 19, a traveling state quantity, which is a state quantity indicating a traveling state of the vehicle 10, is input from a sensor provided on each part of the vehicle 10. The traveling state quantity includes an amount indicating an operating state of the engine 11, such as a vehicle speed V, an output rotation speed NE and an output torque TE of the engine 11, and a coolant temperature. Further, the traveling state quantity also includes a quantity indicating an operating state of the transmission 12, such as an output rotation speed NO and an output torque TO of the transmission 12, a gear stage, and a hydraulic oil temperature. Then, based on the input traveling state quantity, the electronic control unit 19 controls the traveling state of the vehicle 10, such as a control of the operating state of the engine 11 or a switching control of the gear stage of the transmission 12.

During traveling of the vehicle 10, a rattling sound of gears may be generated in the transmission 12. Then, the rattling sound may be transferred to the vehicle cabin 20 as noise that the occupant feels uncomfortable hearing. Vibration generated in the transmission 12 reaches the vehicle cabin 20 via various routes. The sound heard by the occupant aboard the vehicle cabin 20 is a combination of vibration transferred via each route. As a transfer route of vibration from the transmission 12 to the vehicle cabin 20 in the vehicle 10, there are many routes including, for example, the following routes (a) to (e):

(A) A route from the transmission 12 to the vehicle cabin 20 via the sound insulating material 21.

(B) A route from the transmission 12 to the vehicle body 18 via the transmission mount 17 and from the vehicle body 18 to the vehicle cabin 20.

(C) A route from the transmission 12 to the vehicle body 18 via the engine 11 and the engine mount 16 and from the vehicle body 18 to the vehicle cabin 20.

(D) A route from the transmission 12 to the propeller shaft 13 and from the propeller shaft 13 to the vehicle cabin 20 via the vehicle body 18.

(E) A route from the transmission 12 to the differential gear mechanism 14 via the propeller shaft 13, and from the differential gear mechanism 14 to the vehicle cabin 20 via the vehicle body 18.

How the rattling sound of the gear generated in the transmission 12 is heard by the occupant in the vehicle cabin 20 is greatly influenced by the vibration transfer characteristic of a vehicle part positioned on such a vibration transfer route.

In the description below, a vehicle part positioned on each vibration transfer route from the transmission 12, which is the source of the noise, to the vehicle cabin 20, which is the evaluation position of the noise, will be referred to as a route part. The vibration transfer characteristic of each route part has variations during manufacturing or changes over time. In addition, the cause of the noise may be a route part, not the transmission 12, which is the source. When the noise caused by the route part is generated, the noise inspection apparatus 30 according to the present embodiment is configured as an apparatus that executes an inspection for specifying the route part that is the cause.

Configuration of Noise Inspection Apparatus

As illustrated in FIG. 1, the noise inspection apparatus 30 according to the present embodiment is configured as an electronic calculator that includes an execution device 31 that executes a process according to the noise inspection and a storage device 32 that stores a program and data used for the process. The storage device 32 stores a neural network 33 used for the noise inspection.

A measurement device 34 is connected to the noise inspection apparatus 30. A microphone 35, and an impulse hammer 36 and an acceleration sensor 37 for a vibration test are connected to the measurement device 34. Such a measurement device 34 is used for measuring the original sound characteristic value and the evaluation sound characteristic value used for the noise inspection for specifying the route part that is the cause of the noise. The original sound characteristic value is a value indicating the characteristic of the sound generated by the vehicle part, which is the source of the noise. In the following description, a vehicle part, which is the cause of the noise, will be referred to as a sound source part. In the present embodiment, the transmission 12 is the sound source part. The evaluation sound characteristic value is a value indicating the characteristic of the sound that reaches the evaluation position of the noise from the sound source part. In the present embodiment, a predetermined position inside the vehicle cabin 20 is set as the evaluation position.

Measurement of Original Sound Characteristic Value and Evaluation Sound Characteristic Value Next, measurement of the original sound characteristic value and the evaluation sound characteristic value will be described. In the present embodiment, the original sound characteristic value and the evaluation sound characteristic value are measured in a state where the engine 11 of the vehicle 10, which is a noise inspection target, is stopped and the vehicle 10 is stopped. Further, at the time of the measurement, the microphone 35 is installed at a predetermined position inside the vehicle cabin 20 set as the evaluation position, and the acceleration sensor 37 is provided on the transmission 12. Then, in that state, the impulse hammer 36 executes impulse excitation of the transmission 12. The measurement device 34 acquires the outputs of the acceleration sensor 37 and the microphone 35 at each predetermined sampling cycle after the impulse excitation. In the present embodiment, time series data of the output of the acceleration sensor 37 acquired by the measurement device 34 at this time is used as the measured value of the original sound characteristic value. Moreover, in the present embodiment, time series data of the output of the microphone 35 acquired by the measurement device 34 at this time is used as the measured value of the evaluation sound characteristic value. In other words, in the present embodiment, waveform data of vibration of the transmission 12 generated by the impulse excitation is measured as the original sound characteristic value. Further, in the present embodiment, waveform data of the sound inside the vehicle cabin 20 at the time of measuring the original sound characteristic value is measured as the evaluation sound characteristic value.

Configuration of Neural Network

At the time of the noise inspection, the noise inspection apparatus 30 acquires, from the measurement device 34, the measured values of the original sound characteristic value and the evaluation sound characteristic value in the vehicle 10, which is the inspection target. Then, the noise inspection apparatus 30 executes the noise inspection using the acquired measured values and the neural network 33 stored in the storage device 32. Hereinbelow, a configuration of the neural network 33 used for such a noise inspection will be described.

Figure 2:
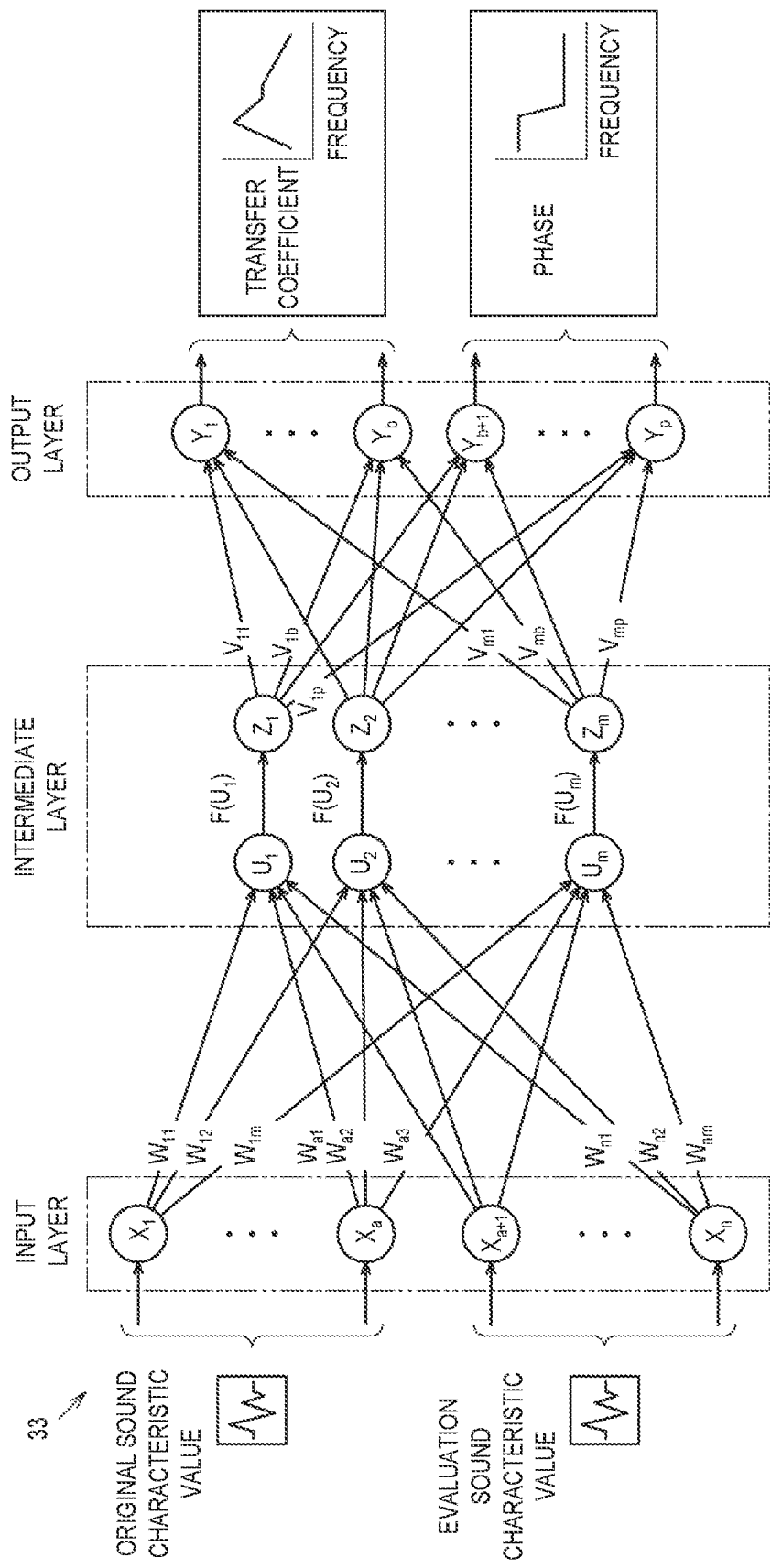
FIG. 2 is a diagram schematically illustrating a configuration of a neural network used by the noise inspection apparatus.

As illustrated in FIG. 2, the neural network 33 includes an input layer having "n" nodes, an intermediate layer having "m" nodes, and an output layer having "p" nodes. In the following description, "i" represents any integer of 1 or more and n or less, "j" represents any integer of 1 or more and m or less, and "k" represents any integer of 1 or more and p or less, respectively.

In FIG. 2, input values to respective nodes of the input layer are represented as X1, X2, ..., Xn. From among the input values, the measured values of the original sound characteristic values are input to X1 to Xa, and the measured values of the evaluation sound characteristic values are input to Xa+1 to Xn. Specifically, the time series data of the output of the acceleration sensor 37, measured in the above-described vibration test, is input to X1 to Xa. Further, the time series data of the output of the microphone 35, measured in the vibration test, is input to Xa+1 to Xn.

In addition, in FIG. 2, input values to respective nodes of the intermediate layer are represented as U1, U2, ..., Um, and the output values of respective nodes of the intermediate layer are represented as Z1, Z2, ..., Zm. An input value Uj of each node of the intermediate layer is calculated as the sum of values obtained by multiplying each of the input values X1, X2, ..., Xn of the input layer by a weight Wij. An output value Zj to each node of the intermediate layer is calculated as a return value of the activation function F with the input value Uj of the corresponding node as an argument. In the present embodiment, the sigmoid function is used as the activation function F.

Further, in FIG. 2, input values to respective nodes of the output layer are represented as Y1, Y2, ..., Yp. The sum of values obtained by multiplying an output value Zj of each node of the intermediate layer by a weight Vjk is input to each of Y1 to Yp. Then, the input values Y1 to Yp of the respective nodes of the output layer become the outputs of the neural network 33. In this neural network 33, Y1 to Yp represent values indicating the vibration transfer characteristic of one of the route parts, such as the propeller shaft 13. Specifically, Y1 to Yb indicate the vibration transfer coefficients for each frequency of the vibration transfer function of the route part, that is, gains, respectively. Further, Yb+1 to Yp indicate phases of the vibration transfer functions for each frequency of the vibration transfer function of the same route part, respectively.

As described above, the neural network 33 is configured to receive the original sound characteristic value and the evaluation sound characteristic value as inputs while outputting the vibration transfer characteristic value of the route part. In such an embodiment, the evaluation sound characteristic value corresponds to the first characteristic value, and the vibration transfer characteristic value of the route part corresponds to the second characteristic value, respectively.

In addition, the storage device 32 stores a plurality of neural networks 33 corresponding to different route parts, respectively. As the route part for which the neural network 33 is provided, a part that is highly likely to cause the noise is selected. In other words, the route part has large changes in vibration when the noise passes through the part, and has an individual difference in vibration transfer characteristic or large changes over time. The vibration transfer coefficients and the phases of a plurality of route parts, which are inspection targets, may be included in an input value of each node of the output layer of the neural network 33, and the neural network 33 of the plurality of route parts may be combined into one.

Learning of Neural Network

Next, a method of generating such a neural network 33, that is, learning of the neural network 33 will be described. The learning of the neural network 33 is executed by a learning electronic calculator. The storage device 32 of the noise inspection apparatus 30 stores the neural network 33 which is learned by the learning electronic calculator, that is, a learned network.

At the time of the learning of the neural network 33, the original sound characteristic value and the evaluation sound characteristic value are measured by the vibration test on a plurality of vehicles 10 of the same vehicle type. Further, the vibration transfer characteristic value of the route part is measured in each vehicle 10. The vibration transfer characteristic value of the route part is measured, for example, through the vibration test of the route part alone. Then, a data set that combines the original sound characteristic value, the evaluation sound characteristic value, and the vibration transfer characteristic value of the route part into one is created for each vehicle 10.

The learning of the neural network 33 is executed using the teacher data composed of a large number of data sets that are created in such a manner. Specifically, first, the original sound characteristic value and the evaluation sound characteristic value in the data set are input to the input layer of the neural network 33 as the values of X1 to Xn. Then, with respect to the above inputs, the values of the respective weights Wij, Vjk are corrected using an error back propagation method such that an error between the values of Y1 to Yp output by the neural network 33 and the value of the vibration transfer characteristic value of the route part in the data set becomes small. The process for correcting the weights Wij, Vjk is repeated until the error becomes equal to or less than a predetermined value. Then, when the error becomes equal to or less than the predetermined value, it is determined that the learning of the neural network 33 is completed.

Noise Inspection

Subsequently, an embodiment of the noise inspection by the noise inspection apparatus 30 of the present embodiment will be described. The noise inspection here is executed in order to specify the cause of the noise when the vehicle 10 in which the noise is generated is brought in to a dealer or the like by the user. When the cause of the noise is in the transmission 12, which is the source of the noise, that is, when the transmission 12 generates a loud noise, it is easy to confirm by human hearing that the cause is in the transmission 12. However, when the cause of the noise is in the route part, it is difficult to specify the cause only by human hearing. The noise inspection here is an inspection executed when it is confirmed that the cause of the noise is not in the transmission 12 and it is suspected that the cause of the noise is in any of the route parts.

At the time of the noise inspection, first, an acceleration sensor 37 is installed in the transmission 12 of the vehicle 10, which is the inspection target, and a microphone 35 is installed in the vehicle cabin 20. Then, the original sound characteristic value and the evaluation sound characteristic value are measured, using the measurement device 34 in the above-described manner. After the measurement, the execution device 31 executes a determination process for determining whether each of the route part is the cause of the noise.

Figure 3:
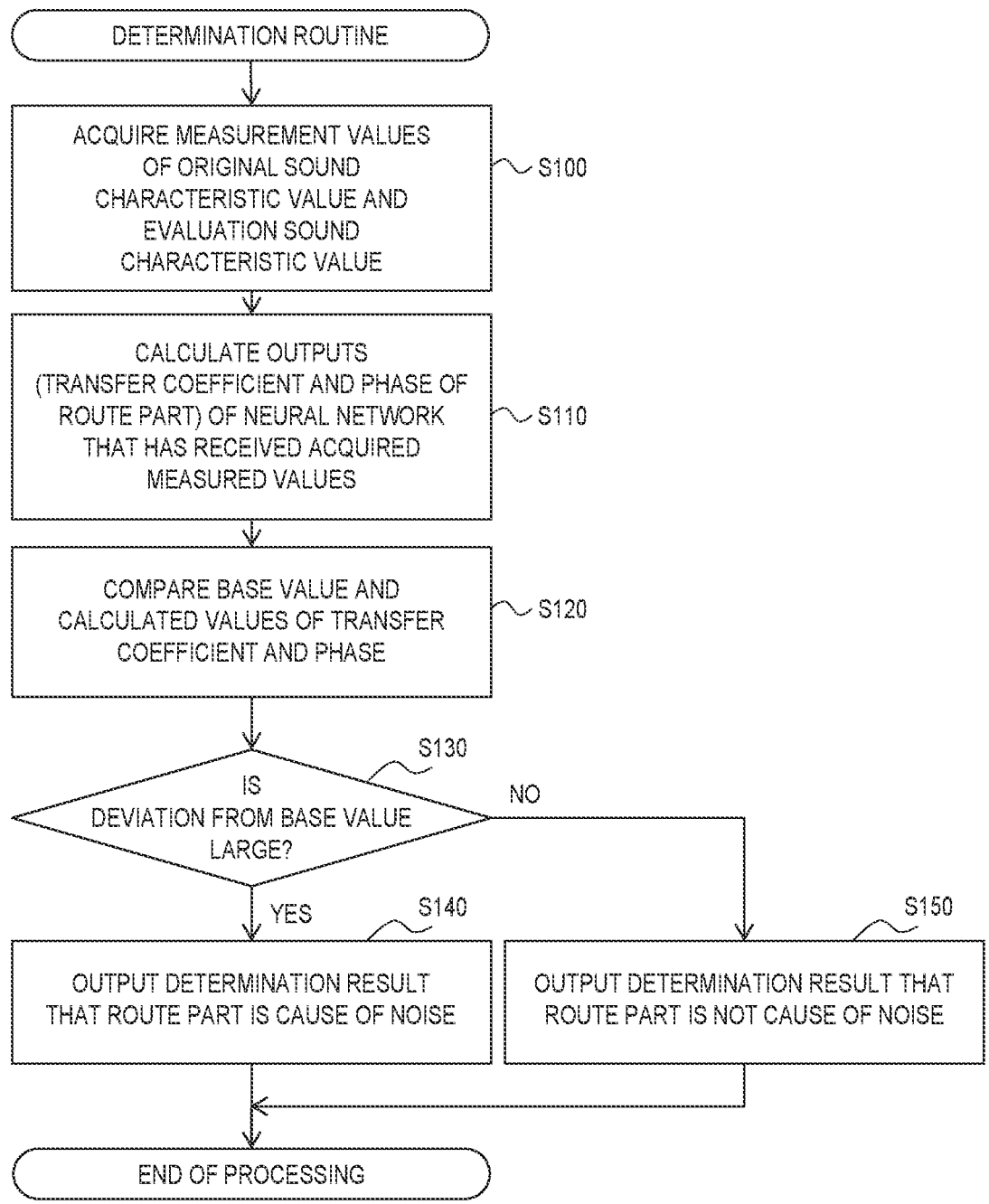
FIG. 3 is a flowchart of a determination routine executed by an execution device of the noise inspection apparatus.

FIG. 3 illustrates processing procedures of a determination routine executed by the execution device 31 for the above determination. This routine is executed individually for each route part provided with the neural network 33. In the following description, the route part, which is a target of the determination routine, will be referred to as an inspection target part.

When this routine is started, in step S100, the execution device 31 first acquires the measurement values of the original sound characteristic value and the evaluation sound characteristic value from the measurement device 34. Then, in the subsequent step S110, the execution device 31 calculates the output of the neural network 33 using the measured values as inputs. The output of the neural network 33 calculated here is the vibration transfer characteristic value of the inspection target part of the vehicle 10, which is the inspection target, that is, the estimated values of the vibration transfer coefficient and the phase of the same part.

The storage device 32 stores, in advance, respective base values of the vibration transfer coefficient and the phase of the inspection target part. Then, in the subsequent step S120, the execution device 31 compares the base values with the calculated values of the vibration transfer coefficient and the phase in step S110, and determines whether the inspection target part is the cause of the noise. In other words, upon determining that a deviation between the calculated values of the vibration transfer coefficient and the phase and the base value is large (S130: YES), the execution device 31 outputs a determination result that the inspection target part is the cause of the noise (S140). On the other hand, upon determining that the deviation is not large (S130: NO), the execution device 31 outputs a determination result that the inspection target part is not the cause of the noise (S150).

Action and Advantageous Effect of First Embodiment

In the present embodiment, the vibration transfer characteristic value of the route part is estimated using the neural network 33. In other words, the neural network 33 receives the original sound characteristic value indicating the characteristic of the sound generated by the transmission 12, which is the source of the noise, and the evaluation sound characteristic value indicating the characteristics of the sound transferred to the vehicle cabin 20, which is the evaluation position of the noise, as inputs, and outputs the vibration transfer characteristic value of the route part. Then, the same neural network 33 is learned, using the respective measured values of the original sound characteristic value, the evaluation sound characteristic value, and the vibration transfer characteristic value of the route part as the teacher data.

The waveform of the sound transferred from the transmission 12 to the vehicle cabin 20 reflects the vibration transfer characteristics of the vehicle parts, that is, respective route parts, positioned on the vibration transfer route from the transmission 12 to the vehicle cabin 20. When the number of route parts present on the vibration transfer route from the transmission 12 to the vehicle cabin 20 is small, it is possible to obtain the vibration transfer characteristic value of the route part from the original sound characteristic value and the evaluation sound characteristic value by an existing method, such as a waveform analysis, as well. However, in the actual vehicle 10, a large number of route parts are interposed in the vibration transfer route from the transmission 12 to the vehicle cabin 20, and it is difficult to obtain the vibration transfer characteristic of each route part by the existing method. On the other hand, in the neural network 33, even when the relationship between the original sound characteristic value and the evaluation sound characteristic value, and the vibration transfer characteristic value of the route part is unclear, the relationship can be learned.

With the vehicle noise inspection apparatus according to the above present embodiment, it is possible to obtain the following advantageous effects.

(1) By using the neural network 33 configured as above, it is possible to accurately estimate the vibration transfer characteristic value of the route part from the measurement results of the original sound characteristic value and the evaluation sound characteristic value by the vibration test.

(2) By using the estimation result of the vibration transfer characteristic value of each route part, it is possible to specify the route part, which is the cause of the noise.

(3) Since the original sound characteristic value and the evaluation sound characteristic value are measured by the vibration test of the transmission 12, it is possible to easily execute the inspection for specifying the cause of the noise.

Second Embodiment

Next, a second embodiment of the vehicle noise inspection apparatus will be described in detail with reference to FIG. 4. In the present embodiment, the same reference signs are given in the configurations common to the above embodiment, and detailed description thereof will be omitted.

In the first embodiment, the measurement of the original sound characteristic value and the evaluation sound characteristic value for the noise inspection and the learning of the neural network 33 is executed in a state where the vehicle 10 is not moving. However, the sound generated by the transmission 12 or the vibration transfer characteristic of each route part changes depending on the traveling state of the vehicle 10. Therefore, in the present embodiment, the measurement of the original sound characteristic value and the evaluation sound characteristic value is executed during the traveling of the vehicle 10.

Figure 4:
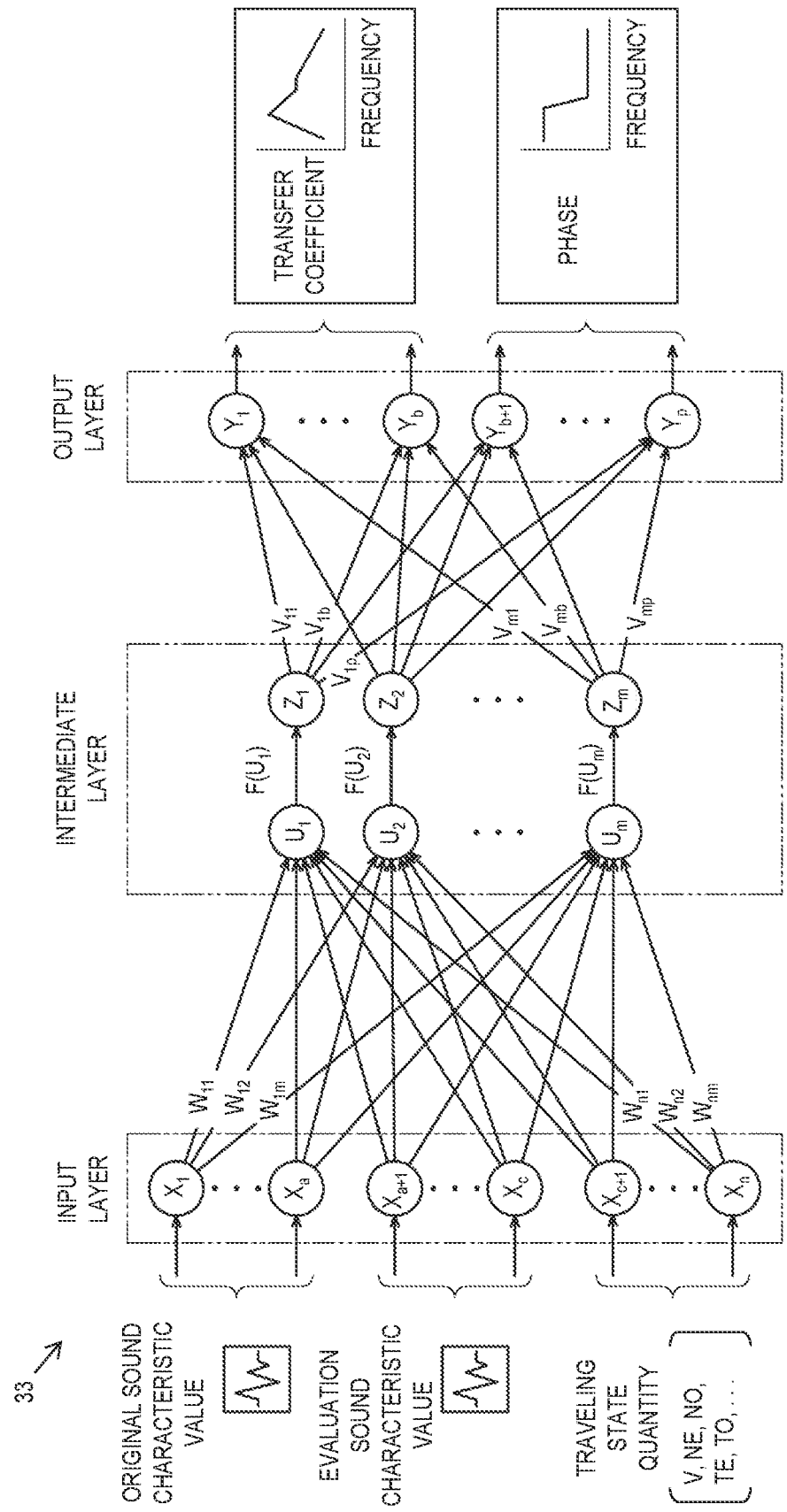
FIG. 4 is a diagram schematically illustrating a configuration of a neural network used in a second embodiment of the vehicle noise inspection apparatus.

FIG. 4 illustrates a configuration of a neural network 33 employed in the present embodiment. In FIG. 4, from among respective nodes of an input layer, the measured values of the original sound characteristic values are input to X1 to Xa, the measured values of the evaluation sound characteristic values are input to Xa+1 to Xc, and the measured values of the traveling state of the vehicle 10 are input to Xc+1 to Xn, respectively. The traveling state quantity of the vehicle 10 includes the vehicle speed V, the output rotation speed NE and the output torque TE of the engine 11, and the output rotation speed NO and the output torque TO of the transmission 12. In the case of FIG. 4 as well, an intermediate layer and an output layer of the neural network 33 are configured in the same manner as in the case of FIG. 3.

At the time of the measurement of the original sound characteristic value and the evaluation sound characteristic value in the present embodiment, the microphone 35 is installed in the vehicle cabin 20 and the acceleration sensor 37 is attached to the transmission 12. Then, the vehicle 10 is caused to travel on a bench stand. Based on the outputs of the microphone 35 and the acceleration sensor 37 at this time, the measurement device 34 acquires the waveform data of the sound in the transmission 12 and inside the vehicle cabin 20 as the measured values of the original sound characteristic value and the evaluation sound characteristic value. Further, the measurement device 34 acquires the traveling state quantity of the same vehicle 10 from the electronic control unit 19 of the vehicle 10. As described above, in the present embodiment, the original sound characteristic value and the evaluation sound characteristic value are measured in the state where the vehicle 10 is caused to actually travel, instead of the vibration test by the impulse hammer 36.

Further, in the present embodiment, learning of the neural network 33 is executed, using a data set in which the respective measured values of the original sound characteristic value, the evaluation sound characteristic value, the traveling state quantity of the vehicle 10, and the vibration transfer characteristic value of the route part are combined into one as the teacher data. The teacher data includes a large number of data sets composed of the original sound characteristic value, the evaluation sound characteristic value, the traveling state quantity of the vehicle 10, and the vibration transfer characteristic value of the route part measured in various traveling states of a large number of vehicles 10 having different usage periods and the like.

The execution device 31 in the noise inspection apparatus 30 according to the present embodiment calculates, as the estimated value of the vibration transfer characteristic value of the route part, the output of the neural network 33 that has received the measured values of the original sound characteristic value, the evaluation sound characteristic value, and the traveling state quantity of the vehicle 10 as inputs, and executes the noise inspection. In other words, the execution device 31 of the present embodiment executes the determination routine in the next aspects. In other words, in step S100 of FIG. 3, the execution device 31 of the present embodiment acquires the measured values of the original sound characteristic value and the evaluation sound characteristic value, and the measured value of the traveling state quantity of the vehicle 10 at the time of the measuring the original sound characteristic value and the evaluation sound characteristic value. Subsequently, in step S110, the execution device 31 calculates, as the vibration transfer characteristic value of the route part, the output of the neural network 33 of FIG. 4 that has received respective measured values acquired in step S100 as inputs. Then, the execution device 31 of the present embodiment executes the noise inspection by executing the same processing in step S120 and thereafter as in the case of the first embodiment.

As described above, in the first embodiment, the vibration test of the transmission 12 is executed by the impulse hammer 36 to measure the original sound characteristic value and the evaluation sound characteristic value. Then, the learning of the neural network 33 is executed based on the measured values. However, the situation of the noise generation changes depending on the traveling state of the vehicle 10. For this reason, it may not be possible to appropriately learn the relationship between the original sound characteristic value and the evaluation sound characteristic value, and the vibration transfer characteristic value of the route part only based on the measured values at the time of the vibration test.

On the other hand, in the present embodiment, the neural network 33 is learned based on the measured values of the original sound characteristic value and the evaluation sound characteristic during the traveling of the vehicle 10. For this reason, the neural network 33 can be learned by reflecting the situation of the noise generation during the actual traveling of the vehicle 10. Further, the traveling state quantity of the vehicle 10 is included in the input of the neural network 33 and learning the teacher data of the same neural network 33. For this reason, the neural network 33 can be learned by reflecting the change in the situation of the noise generation due to the traveling state of the vehicle 10.

Third Embodiment

Next, a third embodiment of the vehicle noise inspection apparatus will be described in detail with reference to FIG. 5. In the present embodiment, the same reference signs are given in the configurations common to the above embodiment, and detailed description thereof will be omitted.

Based on an existing vehicle model, a new vehicle model that employs common parts except for some parts may be developed. When a part changed from a base vehicle model is a part corresponding to a route part, unpleasant noise may be generated due to the change. For this reason, when developing such a vehicle model, whether unpleasant noise is generated due to the change of the part may be evaluated. The noise inspection apparatus according to the present embodiment is configured as an apparatus that executes the noise inspection for such an evaluation.

Figure 5:
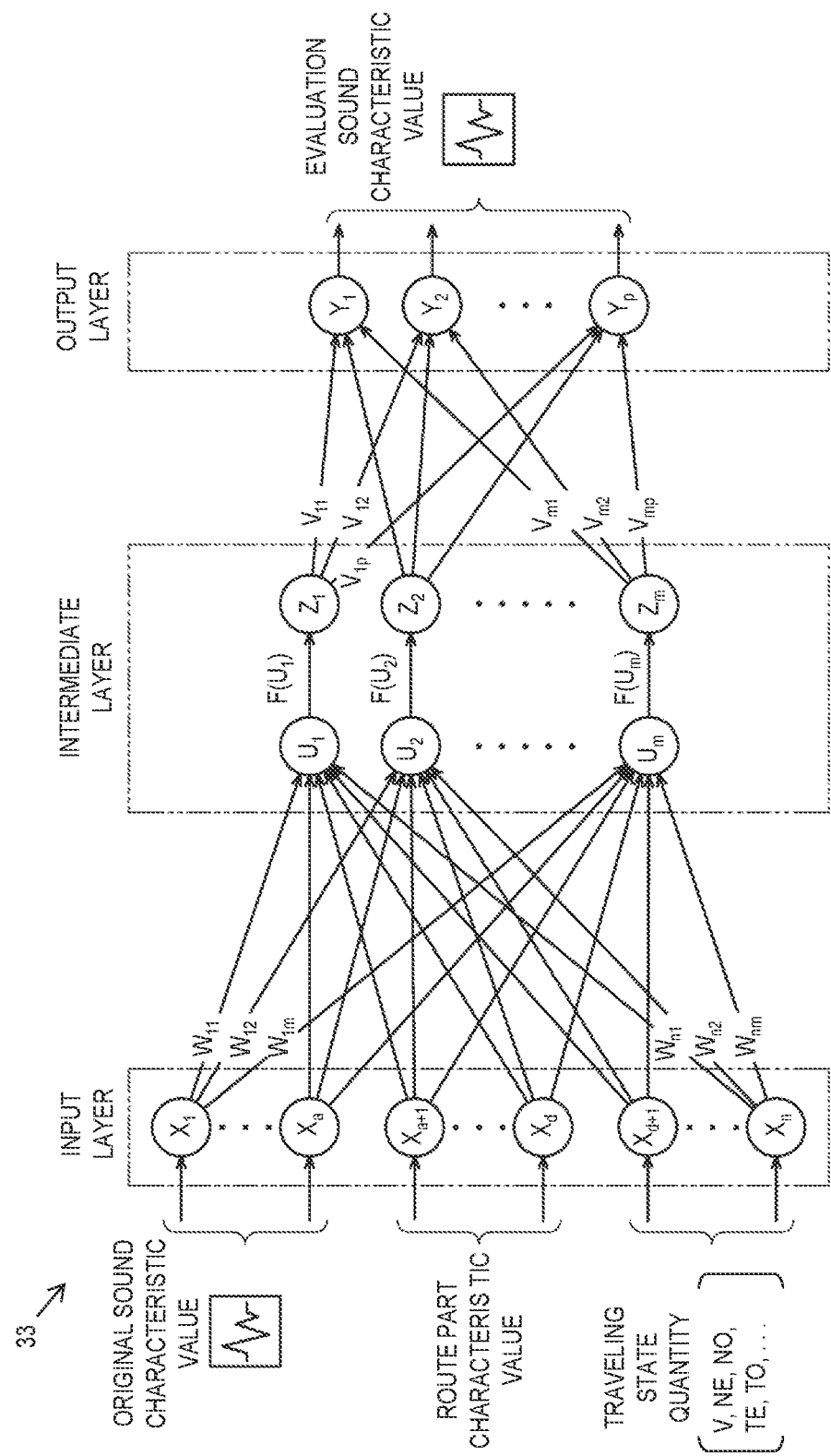
FIG. 5 is a diagram schematically illustrating a configuration of a neural network used in a third embodiment of the vehicle noise inspection apparatus.

FIG. 5 illustrates a configuration of the neural network 33 employed in the present embodiment. In FIG. 5, from among respective nodes of an input layer, the measured values of the original sound characteristic values are input to X1 to Xa, the measured values of the route part characteristic values indicating the vibration transfer characteristic of the route part are input to Xa+1 to Xd, and the measured values of the traveling state of the vehicle 10 are input to Xd+1 to Xn, respectively. On the other hand, Y1 to Yp, which are values of respective nodes of an output layer, are evaluation sound characteristic values. The input values Xa+1 to Xd of the input layer include the route part characteristic values of a plurality of route parts.

In the present embodiment, a data set composed of the measured values of the original sound characteristic value, the evaluation sound characteristic value, the traveling state quantity of the vehicle 10, and the route part characteristic value that are measured in the same manner as in the second embodiment is used as the teacher data of the neural network 33. However, in the case of the present embodiment, at the time of the learning of the neural network 33, the measured values of the original sound characteristic value, the traveling state quantity of the vehicle 10, and the route part characteristic value in the data set are input to the input values. Then, with respect to the above inputs, the learning of the neural network 33 is proceeded by correcting the value of the respective weights Wij, Vjk such that an error between the values of Y1 to Yp output by the neural network 33 and the measured value of the evaluation sound characteristic value in the data set becomes small.

At the time of the noise inspection for evaluating the presence or absence of noise due to the part change, the vibration transfer characteristic value of the route part to be changed can be obtained by the vibration test, a simulation, or the like, of a prototype. Further, the characteristic value of the sound generated by the transmission 12 in each traveling state of the vehicle 10, that is, the original sound characteristic value is measured by a traveling test, the simulation, or the like, of the prototype of the vehicle 10. As the measured value of the original sound characteristic value, the measured value of the base vehicle model may be diverted. Then, the execution device 31 calculates, as the estimated value of the evaluation sound characteristic value, the output of the neural network 33 that has received the measured values of the route part characteristic value of each route part including the changed part and the original sound characteristic value, and the traveling state quantity of the vehicle 10 at the time of the measurement as inputs. As such, the evaluation sound characteristic value of the vehicle model under development, that is, the waveform data of the sound heard by the occupant inside the vehicle cabin 20 is estimated. Then, based on the estimation result, whether unpleasant noise is generated is evaluated. With the noise inspection apparatus 30 according to the present embodiment, it is possible to confirm the presence or absence of noise due to the part change without making a prototype of an actual vehicle or creating a physical model of precise vibration transfer of the actual vehicle.

Each of the above embodiments can be modified and implemented as follows. The present embodiment and the following modified examples can be combined with each other and implemented within a range in which no technical contradiction arises.

In the above embodiment, the original sound characteristic value is measured using the acceleration sensor 37 provided on the transmission 12, but the original sound characteristic value may be measured using the microphone installed in the vicinity of the transmission 12.

In the above embodiment, the inside of the vehicle cabin 20 is set as the evaluation position of the noise. The rattling sound of the gear in the transmission 12 may leak to the outside of the vehicle, and the noise may be perceived by a person outside the vehicle as unpleasant noise. When inspecting such noise outside the vehicle, an evaluation position is set outside the vehicle 10 and the evaluation sound characteristic value at the evaluation position is measured.

The noise inspection apparatus 30 may be configured as an apparatus that inspects noise caused by sound generated by a vehicle part other than the transmission 12. For example, the engine 11, the propeller shaft 13, and the differential gear mechanism 14 may also be sound source parts that are vehicle parts which cause noise.

In the above embodiment, the waveform data of the sound is used as the original sound characteristic value and the evaluation sound characteristic value, but frequency spectrum data of the sound may be used as the original sound characteristic value and the evaluation sound characteristic value. A frequency spectrum represents the loudness for each frequency component as a function of frequency.

In the above embodiment, the vibration transfer coefficient and the phase of the vibration transfer function of the route part are used as the route part characteristic values. Instead of, or in addition to, one or both of the vibration transfer coefficient and the phase, a value of the coherent function may be used as the route part characteristic value.

In the above embodiment, the vehicle 10 having the engine 11 as a drive source is the noise inspection target, but a vehicle having another drive system, such as an electric vehicle or a hybrid vehicle, may be the noise inspection target.

In the above embodiment, the intermediate layer of the neural network 33 is a single layer, but a plurality of intermediate layers may be provided.

What is claimed is:

1. A noise inspection apparatus of a vehicle, the noise inspection apparatus comprising:
a storage device; and
an execution device,
wherein when a vehicle part that is a source of sound is set as a sound source part, the vehicle part positioned on a transfer route of vibration from the sound source part to an evaluation position of noise is set as a route part, a value indicating a vibration transfer characteristic of the route part is set as a route part characteristic value, a value indicating a characteristic of the sound generated by the sound source part is set as an original sound characteristic value, a value indicating a characteristic of the sound that reaches the evaluation position of the noise is set as an evaluation sound characteristic value,
the storage device is configured to store a neural network that is learned using, as teacher data, measured values of the original sound characteristic value, the evaluation sound characteristic value, and the route part characteristic value, the neural network receiving the original sound characteristic value and the evaluation sound characteristic value as inputs, and outputting the route part characteristic value,
the execution device is configured to execute an estimation process for calculating, as an estimated value of the route part characteristic value, an output of the neural network that receives the measured values of the original sound characteristic value and the evaluation sound characteristic value as inputs,
a transfer coefficient and a phase of the vibration of the route part are used as the route part characteristic value,
the execution device is configured to execute a determination process for determining whether the route part is a cause of the noise based on the calculated value of the route part characteristic value in the estimation process in a state where a generation of the noise is confirmed, and the execution device is configured to determine that the route part is the cause of the noise when the execution device determines that the transfer coefficient and the phase deviate from a base value of the route part.

2. The noise inspection apparatus according to claim 1, wherein the inputs of the neural network include a traveling state quantity that is a quantity indicating a traveling state of the vehicle, and the teacher data includes a measured value of the traveling state quantity at a time of measuring the evaluation sound characteristic value.

3. The noise inspection apparatus according to claim 1, wherein any one of waveform data of the sound and a frequency spectrum is used as the original sound characteristic value and the evaluation sound characteristic value.

4. The noise inspection apparatus according to claim 1, wherein the storage device stores the base value in advance.

\* \* \* \* \*